US006839796B2

(12) United States Patent
Dawson et al.

(10) Patent No.: US 6,839,796 B2
(45) Date of Patent: Jan. 4, 2005

(54) APPARATUS AND METHOD TO IMPORT A LOGICAL VOLUME INDICATING EXPLICIT STORAGE ATTRIBUTE SPECIFICATIONS

(75) Inventors: Erika M. Dawson, Tucson, AZ (US);
James A. Fisher, Tucson, AZ (US);
Jonathan W. Peake, Tucson, AZ (US);
Linda J. Schiltz, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 10/230,548

(22) Filed: Aug. 29, 2002

(65) Prior Publication Data

US 2004/0044826 A1 Mar. 4, 2004

(51) Int. Cl.[7] .............................................. G06F 12/00
(52) U.S. Cl. ........................ 711/4; 711/101; 711/156; 711/203; 707/201; 707/205
(58) Field of Search ................................. 707/201, 205; 711/4, 101, 156, 161, 170, 203

(56) References Cited

U.S. PATENT DOCUMENTS

| 4,755,928 | A | | 7/1988 | Johnson et al. ............. 364/200 |
| 6,202,124 | B1 | | 3/2001 | Kern et al. .................. 711/112 |
| 6,247,103 | B1 | | 6/2001 | Kern et al. .................. 711/162 |
| 6,513,101 | B1 | * | 1/2003 | Fisher et al. ................ 711/159 |
| 2004/0044843 | A1 | * | 3/2004 | Dawson et al. ............. 711/112 |
| 2004/0044851 | A1 | * | 3/2004 | Dawson et al. ............. 711/154 |

OTHER PUBLICATIONS

Erner, et al., "A Model of File Server Performance for a Heterogeneous . . . ", 1986, pp. 338–347.
Menon, "A Performance Comparison of RAID–5 and Log–Structured Arrays", 1995, pp. 167–178.
Savage, "Storage Server as Physical Box", 1988, pp.14–20.

* cited by examiner

*Primary Examiner*—Donald Sparks
*Assistant Examiner*—Christian P. Chace
(74) *Attorney, Agent, or Firm*—Dale F. Regelman (57) ABSTRACT

A method to import a logical volume and first storage attributes assigned to that logical volume into a second virtual tape system from a first virtual tape system. The method assigns one or more first storage attributes to that logical volume, assigns an identifier, and writes an export physical volume comprising the logical volume, the first storage attributes, and the identifier. The method then imports the logical volume, the logical volume identifier, and the first storage attributes, into the second virtual tape system, and associates one or more construct overridden flags with the logical volume if the second virtual tape system specifies use of one or more of second storage attributes.

30 Claims, 6 Drawing Sheets

APPARATUS AND METHOD TO IMPORT A LOGICAL VOLUME INDICATING EXPLICIT STORAGE ATTRIBUTE SPECIFICATIONS

FIELD OF THE INVENTION

Applicant's invention relates to an apparatus and method to import a logical volume and storage attributes assigned to that logical volume into a second information storage medium from a first information storage medium. In certain embodiments, the first information storage medium is disposed in a first virtual tape system and the second information storage medium is disposed in a second information storage medium.

BACKGROUND OF THE INVENTION

In hierarchical computer storage systems, intensively used and fast storage are paired with arrays of slower and less frequently accessed data devices. One example of high-speed, expensive memory is a direct access storage device file buffer (DASD). Slower storage devices include tape drives and disk drive arrays, which are less expensive than a DASD.

One such hierarchical storage system is a virtual tape storage system. Such a virtual tape storage system may include, for example, one or more virtual tape servers ("VTS") in combination with one or more data storage and retrieval systems, such as the IBM TotalStorage® 3494 Enterprise Tape Library. During operation, the virtual tape storage system is writing data from a host to the numerous data storage devices disposed in the one or more data storage and retrieval systems.

Automated data storage and retrieval systems are known for providing cost effective access to large quantities of stored media. Generally, a data storage and retrieval system includes a large number of storage slots on which are stored portable data storage media. The typical portable data storage media is a tape cartridge, an optical cartridge, a disk cartridge, electronic storage media, and the like. By electronic storage media, Applicants mean a device such as a PROM, EPROM, EEPROM, Flash PROM, and the like.

One (or more) accessors typically accesses the data storage media from the storage slots and delivers the accessed media to a data storage device for reading and/or writing data on the accessed media. Suitable electronics operate the accessor(s) and operate the data storage device(s) to provide information to, and/or to receive information from, an attached on-line host computer system.

SUMMARY OF THE INVENTION

Applicants' invention includes a method to import a logical volume and storage attributes assigned to that logical volume into a second information storage medium from a first information storage medium. In certain embodiments, Applicants' invention includes a method to import a logical volume and storage attributes assigned to that logical volume into a second virtual tape system from a first virtual tape system. In certain embodiments, the first virtual tape system and the second virtual tape system are the same, where the logical volume is written to physical volume by the first virtual tape system at an exporting time and imported into the second virtual tape system at a later importing time.

Applicants' method includes maintaining a logical volume in a first information storage medium. In certain embodiments that first information storage medium comprises a first direct access storage device file buffer disposed in a first virtual tape system capable of communicating with one or more first host computers.

Applicants' method further includes assigning one or more first storage attributes to that logical volume, writing an export physical volume which includes the logical volume and the assigned first storage attributes. Applicants' method includes defining in the second virtual tape system a plurality of second storage attributes, importing the logical volume and the one or more first storage attributes into the second virtual tape system. Applicants' method then associates a plurality of construct overridden flags with the imported logical volume, and determines if the import list logical volume specifies use of one or more of the second storage attributes.

If the import list logical volume specifies use of second storage attributes, then Applicants' method includes assigning one or more of the plurality of second storage attributes to the imported logical volume, setting one or more of the plurality of construct overridden flags, and saving in a second library the imported logical volume, the one or more assigned second storage attributes, and the plurality of construct overridden flags. If the import list logical volume does not specify use of second storage attributes, then Applicants' method includes clearing one or more of the plurality of construct overridden flags, and saving in a second library the imported logical volume, the one or more assigned first storage attributes, and the plurality of construct overridden flags.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

Referring to the illustrations, like numerals correspond to like parts depicted in the figures. The invention will be described as embodied in a virtual tape server in combination with an automated data storage and retrieval subsystem for use in a data processing environment. The following description of Applicant's apparatus and method is not meant, however, to limit Applicant's invention to either data storage and retrieval systems, or to data processing applications, as the invention herein can be applied to data storage in general.

Figure 3:
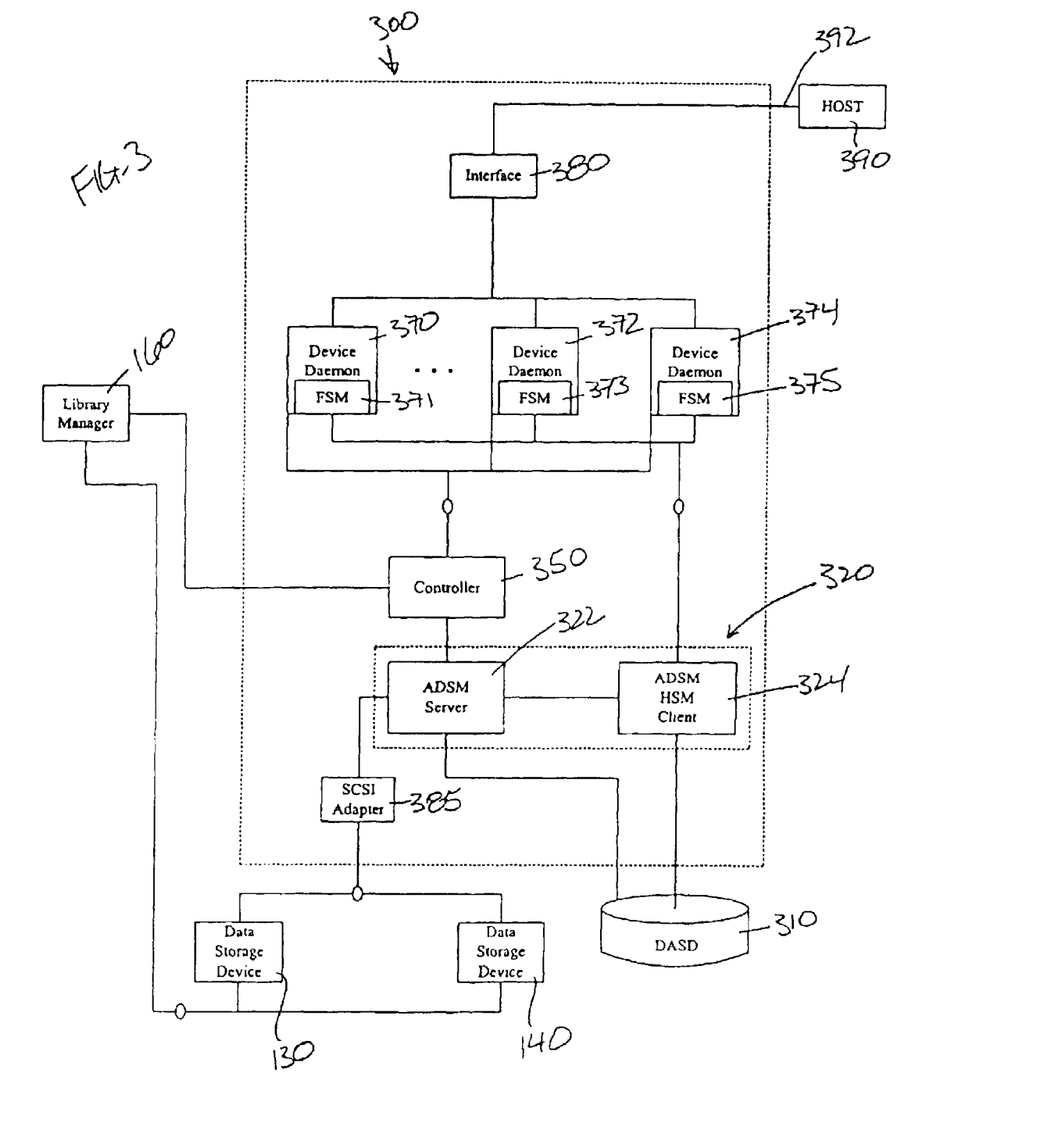
FIG. 3 is a block diagram showing the components of Applicants' virtual tape system.

FIG. 3 illustrates the hardware and software environment in which preferred embodiments of the present invention are implemented. Virtual tape server (VTS) 300 is pictured, operatively coupled to a host computer 390. In certain embodiments, host computer 390 comprises a single computer. In alternative embodiments, host computer 390 comprises one or more mainframe computers, one or more work stations, one or more personal computers, combinations thereof, and the like.

Host computer 390 communicates with VTS 300 via communication link 392 with a host-to-data interface 380 disposed within the virtual tape server 300. Communication link 392 comprises a serial interconnection, such as an RS-232 cable or an RS-432 cable, an ethernet interconnection, a SCSI interconnection, a Fibre Channel interconnection, an ESCON interconnection, a FICON interconnection, a Local Area Network (LAN), a private Wide Area Network (WAN), a public wide area network, Storage Area Network (SAN), Transmission Control Protocol/Internet Protocol (TCP/IP), the Internet, and combinations thereof. In certain embodiments, the host-to-data interface 380 comprises an IBM Enterprise Systems Connection (ESCON) and communication link 392 comprises a fiber optic local area network used to link mainframes to disk drives or other mainframes.

VTS 300 also communicates with direct access storage device (DASD) 310, a plurality of data storage devices 130/140 and library manager 160. Data storage devices 130 and 140, and library manager 160, are disposed within one or more data storage and retrieval systems, such as data storage and retrieval systems 100 (FIG. 1)/200 (FIG. 2). In certain embodiments, DASD 310 is integral with host 390. In certain embodiments, DASD 310 is integral with VTS 300. In certain embodiments, DASD 310 is integral with a data storage and retrieval system. In certain embodiments, DASD 310 is external to host 390, VTS 300, and the one or more data storage and retrieval systems in communication with VTS 300. In the embodiment of FIG. 3, library manager 160 communicates with data storage devices 130 and 140. In alternative embodiments, library manager 160 does not directly communicate with data storage devices 130/140.

VTS 300 further includes storage manager 320, such as the IBM Adstar® Distributed Storage Manager. Storage manager 320 controls the movement of data from DASD 310 to information storage media mounted in data storage devices 130 and 140. In certain embodiments, storage manager 320 includes an ADSM server 322 and an ADSM hierarchical storage manager client 324. Alternatively, server 322 and client 324 could each comprise an ADSM system. Information from DASD 310 is provided to data storage devices 130 and 140 via ADSM server 322 and SCSI adapter 385.

VTS 300 further includes autonomic controller 350. Autonomic controller 350 controls the operations of DASD 310 through the hierarchical storage manager (HSM) client 324, and the transfer of data between DASD 310 and data storage devices 130 and 140. Library manager 160 communicates with autonomic controller 350.

From the host computer 390 perspective, device daemons 370, 372, and 374 appear to comprise multiple data storage devices attached to the host-to-data interface 380. Information is communicated between DASD 310 and host 390 via storage manager 320 and one or more of device daemons 370, 372, and 374.

Host computer 390 comprises a computer system, such as a mainframe, personal computer, workstation, etc., including an operating system such as Windows, AIX, Unix, MVS, LINUX, etc. (Windows is a registered trademark of Microsoft Corporation; AIX is a registered trademark and MVS is a trademark of IBM Corporation; and UNIX is a registered trademark in the United States and other countries licensed exclusively through The Open Group.) In certain embodiments, host computer 390 includes a storage management program 394 (not shown in FIG. 3). The storage management program 394 in the host computer 390 may include the functionality of storage management type programs known in the art that manage the transfer of data to a data storage and retrieval system, such as the IBM DFSMS implemented in the IBM MVS operating system.

The IBM DFSMS software is described in "z/OS V1R3 DFSMS Introduction," IBM document no. SC26-7397-01, which document is incorporated herein by reference in its entirety. Storage management program 394 may include known storage management program functions, such as recall and migration. The storage management program 394 may be implemented within the operating system of the host computer 390 or as a separate, installed application program. Alternatively, storage management program 394 may include device drivers, backup software, and the like.

Figure 1:
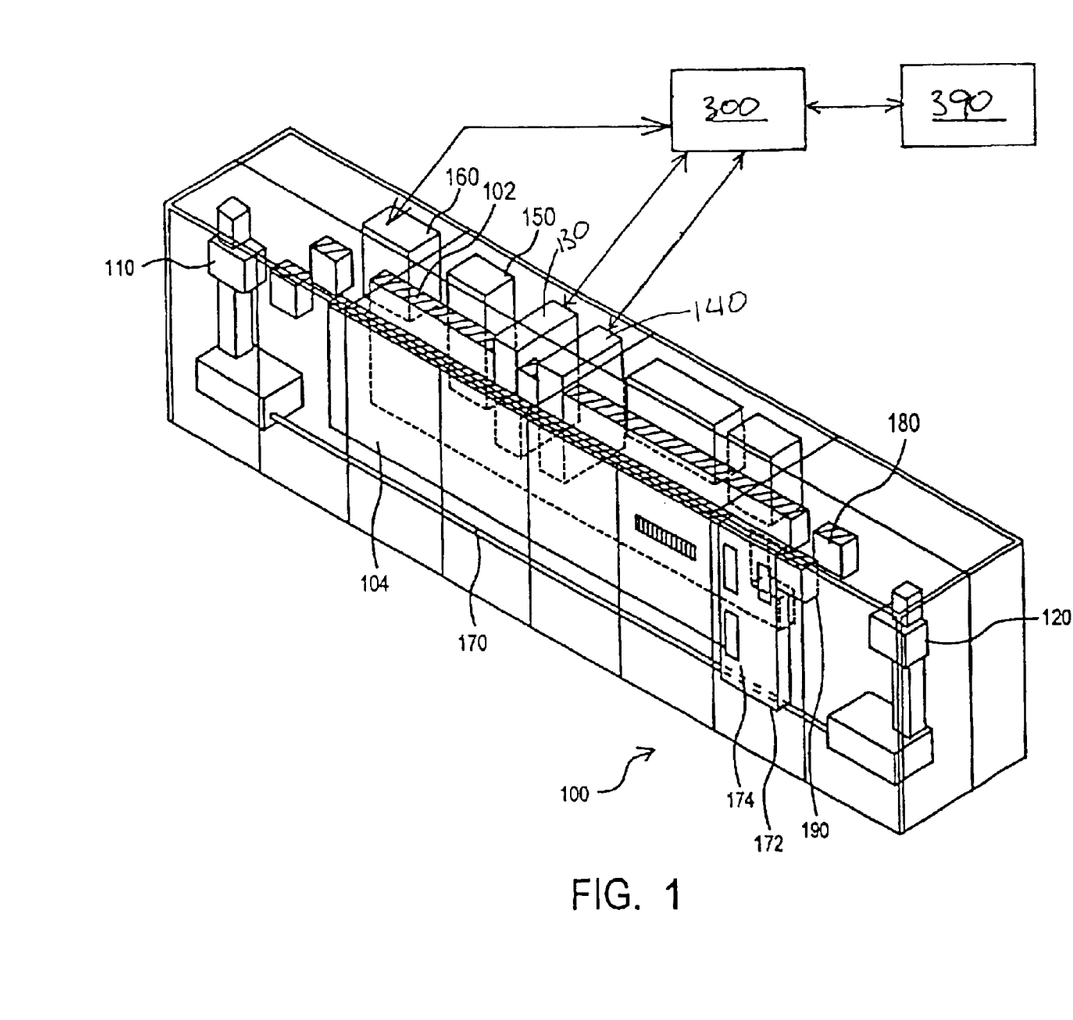
FIG. 1 is a perspective view of a first embodiment of Applicant's data storage and retrieval system.
Figure 2:
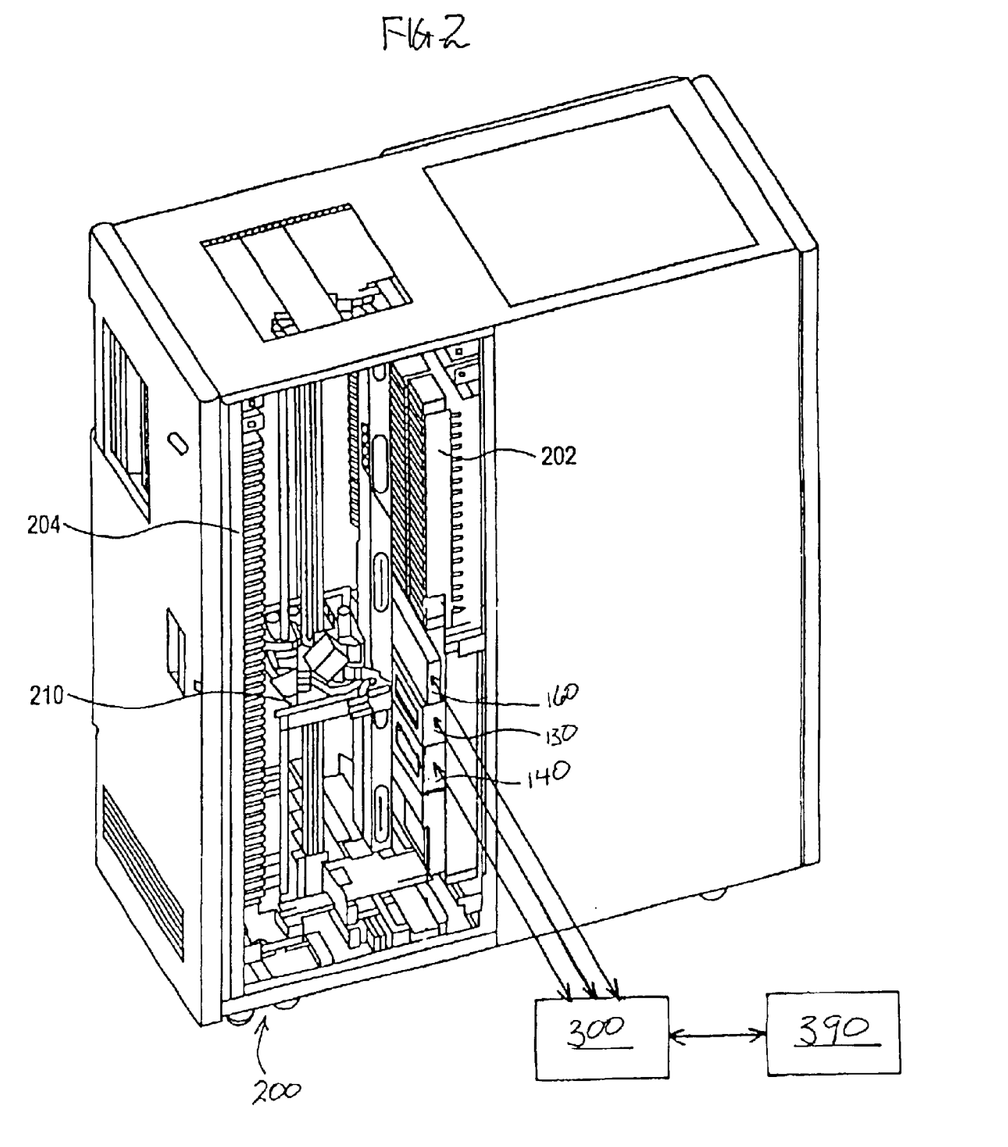
FIG. 2 is a perspective view of a second embodiment of Applicant's data storage and retrieval system.

Referring now to FIG. 1, automated data storage and retrieval system 100 is shown having a first wall of storage slots 102 and a second wall of storage slots 104. Portable data storage media are individually stored in these storage slots. In certain embodiments, such data storage media are individually housed in portable container, i.e. a cartridge. Examples of such data storage media include magnetic tapes, magnetic disks of various types, optical disks of various types, electronic storage media, and the like.

Applicant's automated data storage and retrieval system includes one or more accessors, such as accessors 110 and 120. An accessor is a robotic device which accesses portable data storage media from first storage wall 102 or second storage wall 104, transports that accessed media to data storage devices 130/140 for reading and/or writing data thereon, and returns the media to a proper storage slot. In certain embodiments, data storage devices 130 (FIGS. 1, 2, 3) and 140 (FIGS. 1, 2, 3) comprise IBM TotalStorage® 3590 tape drives and the portable information storage media comprise magnetic tapes housed in IBM TotalStorage® 3590 tape cartridges.

Device 160 comprises a library manager. In certain of these embodiments, library controller 160 is integral with a computer. Operator input station 150 permits a user to communicate with Applicant's automated data storage and retrieval system 100. Power component 180 and power component 190 each comprise one or more power supply units which supply power to the individual components disposed within Applicant's automated data storage and retrieval system. Import/export station 172 includes access door 174 pivotably attached to the side of system 100. Portable data storage cartridges can be placed in the system, or in the alternative, removed from the system, via station 172/access door 174.

FIG. 2 shows system 200 which comprises another embodiment of Applicant's data storage and retrieval system. System 200 includes first storage wall 202 and second storage wall 204. Storage walls 202 and 204 each include a plurality of storage elements in which can be stored a plurality of portable data storage media. System 200 includes two or more data storage devices, such as devices 130 and 140. Data storage device 130/140 each comprise a floppy disk drive, an optical disk drive, a magnetic tape drive, an electronic media drive, and the like. System 200 further includes controller 160. System 200 further includes operator control panel 150 (not shown in FIG. 2).

System 200 further includes one or a plurality of portable data storage cartridges removeably disposed in one or more slots in storage walls 202/204. Each such cartridge contains a data storage medium internally disposed therein. Such data storage media includes optical media, magnetic media, tape media, electronic media, and combinations thereof.

System 200 also includes at least one robotic accessor 210 for transporting a designated portable data storage medium between a storage slot disposed in first wall 202 or second wall 204 and data storage device 130/140.

Figure 4:
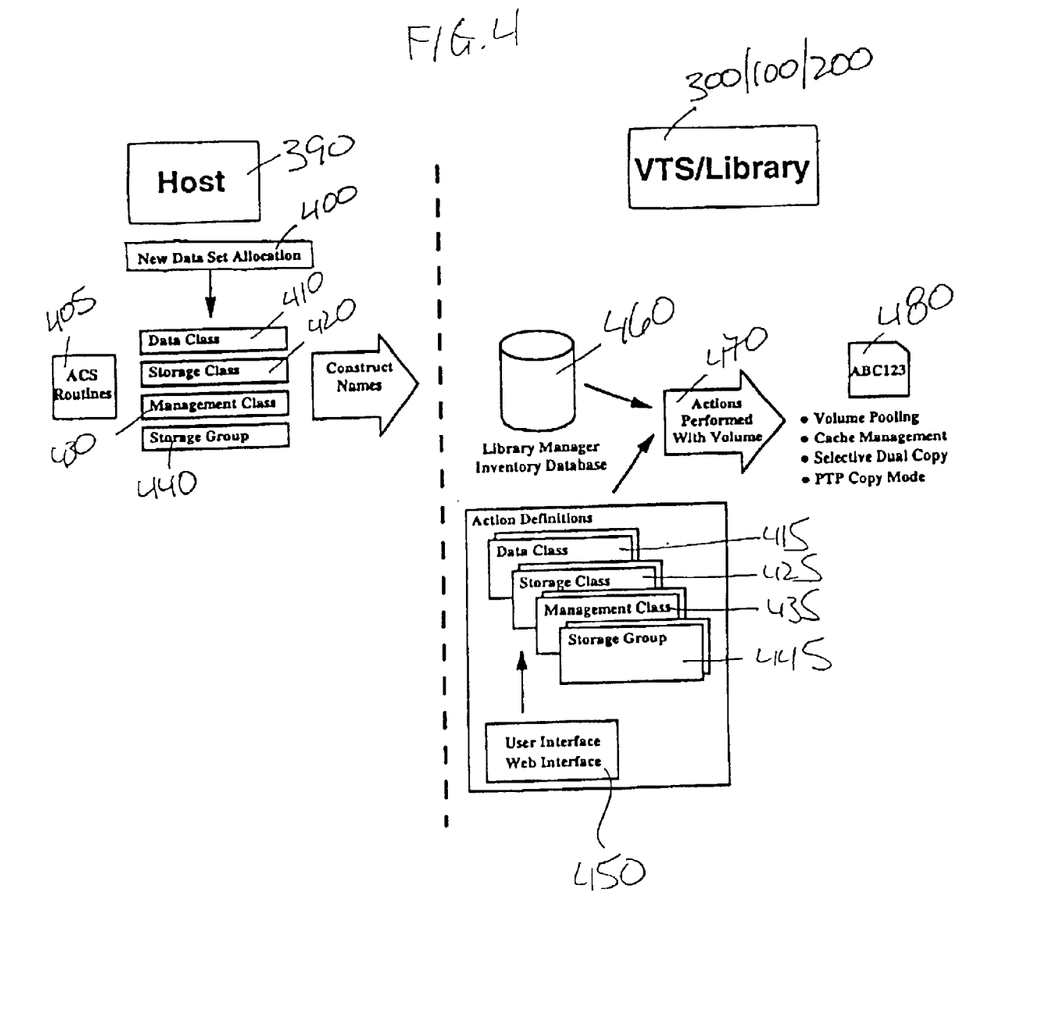
FIG. 4 is a block diagram showing passage of up to four storage construct names from a host computer to Applicants' virtual tape system.

FIG. 4 provides a graphical overview of Applicants' method to export a logical volume from a first information storage medium to a second information storage medium. Host computer 390 creates a new dataset 400. Host 390 includes a set of Automatic Class Selection ("ACS") routines which establish the data management policies for the new dataset, for one or more virtual volumes comprising that dataset, for writing those one or more virtual volumes to one or more physical volumes, and for management of those one or more volumes.

These ACS routines determine which information storage policies are assigned to each logical volume maintained by that host computer. These information policies include one or more data class policies 410, one or more storage class policies 420, one or more management class policies 430, and one or more storage group policies 440.

Data class storage policies include, for example, which recording format to use when writing volumes, which media cartridges to use, and the like. Storage class storage policies include, for example, whether to give the virtual volume preference to be removed or maintained on a DASD, such as DASD 310 (FIG. 3). Management class storage policies include, for example, whether a copy of the logical volume should be made immediately or whether to defer making that copy, selecting one or more information storage media to use when writing volumes, allocating a secondary stacked volume pool, and the like. Storage group storage policies include, for example, specifying a primary stacked volume pool for the logical volume, and the like.

After one ACS routine establishes a certain storage management policy for a dataset, that ACS routine then assigns a storage construct name which indicates the selected storage management policy. In certain embodiments, each such storage construct name comprises an 8 byte designator.

Host computer 390 comprises a plurality of ACS routines. In certain embodiments, host computer 390 comprises between zero and four ACS routines. In certain embodiments, host computer 390 includes more than four ACS routines. In embodiments wherein host 390 includes four ACS routines, for example, host 390 may assign between zero and four storage construct names for new dataset 400. These zero to four storage construct names are passed by host 390 with new dataset 400 to an interconnected virtual tape system. Such an interconnected virtual tape system includes one or more virtual tape servers, such as VTS 300, and one or more data storage and retrieval systems, such as systems 100/200.

The virtual tape system includes a library manager, such a library manager 160 (FIGS. 1, 2). That library manager includes a library inventory 460. Library inventory 460 comprises a database. That inventory database 460 includes fields indicating the storage management policies selected for each virtual volume maintained on that virtual tape system. Thus, library database 460 includes a data class attribute field, a storage class attribute field, a management class attribute field, and a storage group attribute field.

Storage actions associated with each storage construct name are defined for a virtual tape system using an operator input station, such as operator input station 150 (FIG. 1), disposed in that virtual tape system. In certain embodiments, the operator input station is integral with the virtual tape server. In certain embodiments, the operator input station is integral with a data storage and retrieval system. In certain embodiments, the operator input station is remote from both the virtual tape server and the data storage and retrieval system. In these remote operator input station embodiments, operator input station 150 communicates with the virtual tape system using a serial interconnection, such as an RS-422 cable/RS-232 cable, a SCSI interconnection, an ethernet interconnection, a gigabit ethernet interconnection, a Fibre Channel interconnection, an ESCON interconnection, a local area network, a private wide area network, a public wide area network, a TCP/IP interconnection, combinations thereof, and the like.

When Applicants' virtual tape system writes a new dataset to a logical volume the storage construct names assigned to that dataset are stored in library inventory 460 as storage attributes assigned to the logical volume. If the virtual tape system subsequently accesses that logical volume, those storage attributes are recalled and used to determine storage management policies for that logical volume.

Figure 5:
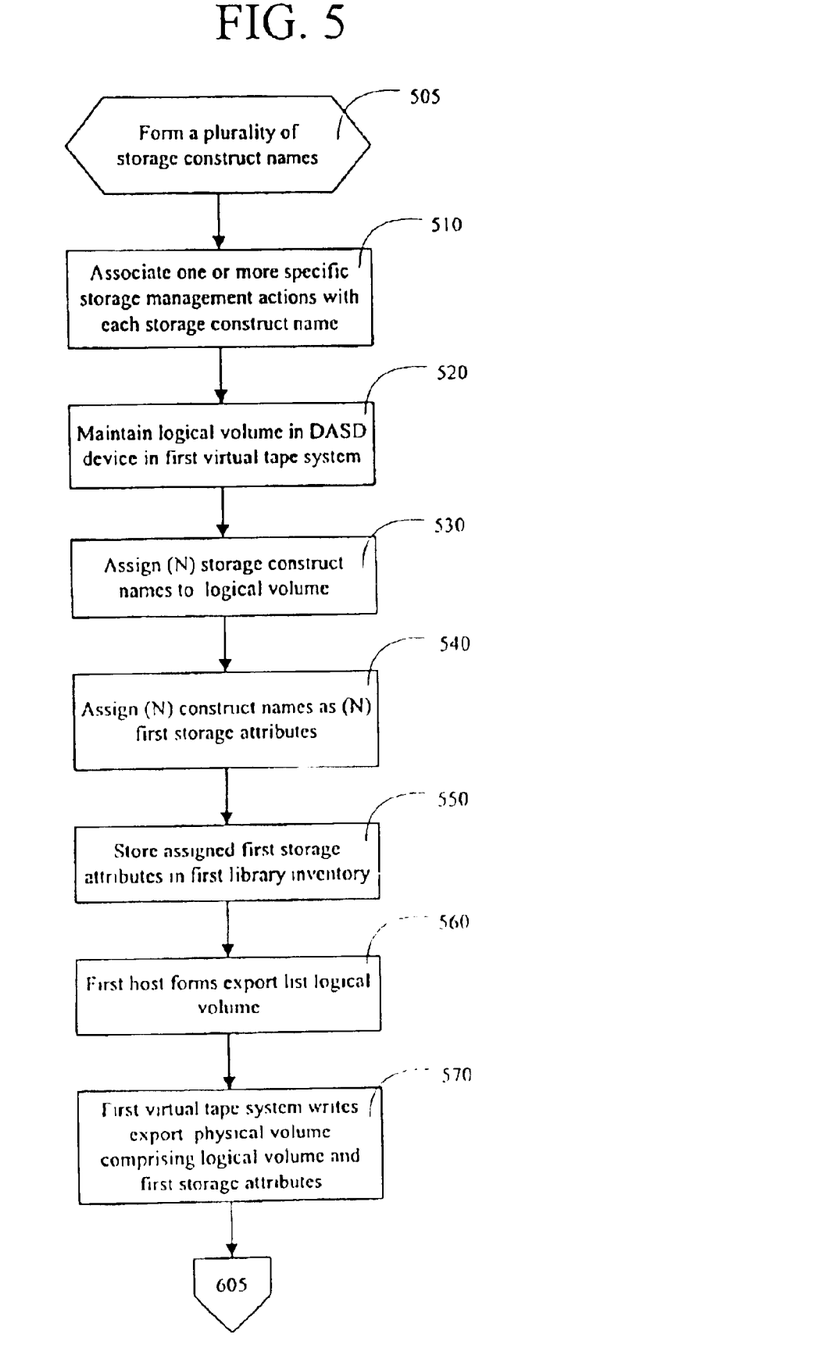
FIG. 5 is a flow chart summarizing the initial steps in Applicants' method.

FIG. 5 summarizes the initial steps in Applicants' method. Referring now to FIG. 5, in step 505 Applicants' method forms at a first time a plurality of storage construct names. In certain embodiments, each of these plurality of storage construct names comprises 8 bytes. In step 510, Applicants' method at a second time associates one or more specific storage management actions with each of the plurality of storage construct names.

In step 520, Applicants' method at a third time, where the third time is subsequent to the first time and the second time, maintains a logical volume on a first information storage medium. In certain embodiments, the first information storage medium comprises a first direct access storage device file buffer (DASD) such as DASD 310 (FIG. 3), disposed in a first virtual tape system, where that first virtual tape system is capable of communicating with one or more first host computers, such as host computer 390 (FIGS. 1, 2, 3, 4). In certain embodiments, step 520 further includes assigning an identifier to the logical volume. In certain embodiments this identifier comprises a volume serial number sometimes referred to as a volser.

In certain embodiments, step 520 further includes writing a dataset by a host computer, assigning by that host computer (N) storage construct names to that dataset, providing the dataset and the (N) storage construct names to the virtual tape system, and writing the dataset to the logical volume.

In step 530, Applicants' method assigns the (N) storage construct names to the logical volume. In certain embodiments, a host computer assigns the (N) storage construct names. In certain embodiments, the user assigns (N) storage construct names. In certain embodiments, (N) is zero. In alternative embodiments, (N) is selected from the group consisting of 1, 2, 3, and 4. In certain embodiments, (N) is greater than four.

In step 540, Applicants' method assigns to the logical volume each of the (N) storage construct names of step 530 as a different first storage attribute. In step 550, Applicants' method stores the logical volume's identifier and the (N) first storage attributes in a library inventory, such as library inventory 460 (FIG. 4), disposed in the first virtual tape system.

In step 560, Applicants' method forms an export list logical volume which includes the identifiers for the logical volumes to be exported. In certain embodiments, an exporting host computer, i.e. the first host computer, forms the export list logical volume. In certain embodiments, file sequence one of the export list logical volume includes one or more identifiers, where those one or more identifiers indicate the logical volumes to export.

In step 570, Applicants' method writes an export physical volume comprising, inter alia, the logical volume to be exported, the identifier assigned to that logical volume, and the first storage attributes assigned to that logical volume. In certain embodiments, the export physical volume of step 570 includes a plurality of logical volumes to be exported, and the identifiers and storage attributes assigned to each of those logical volumes. Applicants' method transitions from step 570 to step 605 (FIG. 6).

Figure 6:
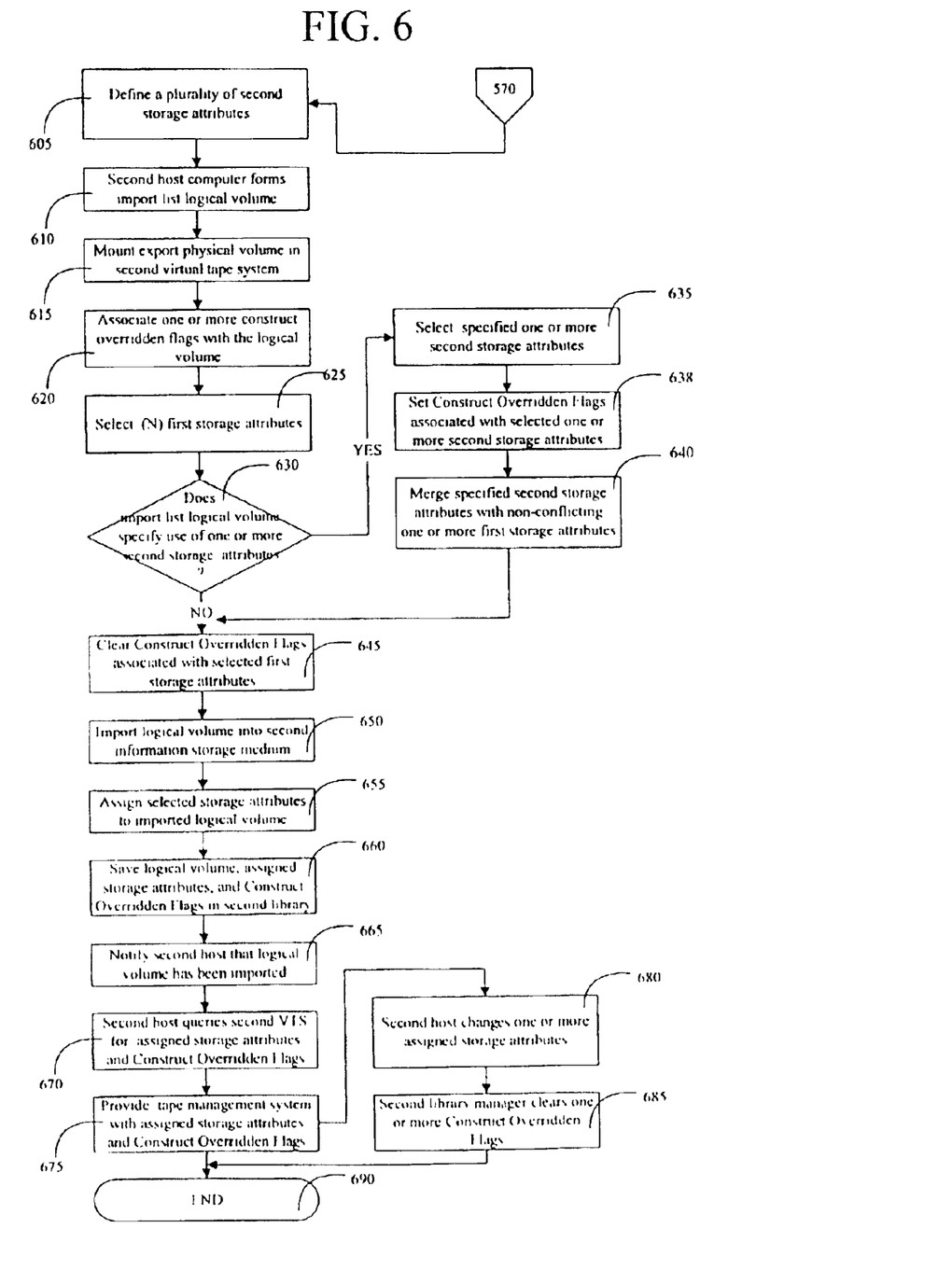
FIG. 6 is a flow chart summarizing additional steps in Applicants' method.

Referring now to FIG. 6, in step 605 Applicants' method defines a plurality of second storage attributes. In certain embodiments, the importing host, i.e. the second host computer, defines that plurality of second storage attributes. In certain embodiments, the importing virtual tape system, i.e. the second virtual tape system, defines that plurality of second storage attributes. In certain embodiments, each of the plurality of second storage attributes are associated with specific storage management actions relating to a logical volume's storage class, data class, management class, or storage group.

In step 610, the importing host computer, i.e. the second host computer, forms an import list logical volume which includes the identifiers for one or more logical volumes to import. In certain embodiments, the import list logical volume of step 610 specifies whether one or more of the second storage attributes of step 605 are to be assigned to the one or more imported logical volumes.

In step 615, Applicants' method mounts the export physical volume of step 590 in a data storage drive, such as data storage drive 130 (FIGS. 1, 2, 3) or 140 (FIGS. 1, 2, 3), disposed in a second virtual tape system, where that second virtual tape system is capable of communicating with the importing host computer. In step 620, the importing virtual tape system associates one or more Construct Overridden Flags with each of the logical volumes to be imported. In certain embodiments, the importing virtual tape system associates four Construct Overridden Flags with the imported logical volume. In the embodiments which include four Construct Overridden Flags, each of the four Construct Overridden Flags is associated with a different one of four storage attributes comprising a data class attribute, a storage class attribute, a management class attribute, and a storage group attribute. In other embodiments, Applicants' method associates fewer than four Construct Overridden Flags with the imported logical volume. In yet alternative embodiments, Applicants' method associates more than four Construct Overridden Flags with the imported logical volume. In certain embodiments, step 620 further includes examining the export physical volume for specific volsers.

In step 625, Applicants' method selects the (N) first storage attributes written to the export physical volume of step 570. Applicants' method transitions from step 625 to step 630, wherein Applicants' method determines if the import list logical volume specifies use of one or more of the second storage attributes of step 605. If Applicants' method determines in step 630 that the import list logical volume does not specify use of second storage attributes, then Applicants' method transitions from step 630 to step 645.

If Applicants' method determines in step 630 that the import list logical volume specifies use of one or more second storage attributes, then Applicants' method transitions from step 630 to step 635 wherein Applicants' method selects those one or more second storage attributes of step 605. Applicants' method transitions from step 635 to step 638 wherein Applicants' method sets one or more of the Construct Overridden Flags. By "setting" a Construct Overridden Flag, Applicants mean indicating that the associated second storage attribute has been selected by the importing virtual tape system for subsequent use with the imported logical volume.

Applicants' method transitions from step 638 to step 640 wherein Applicants' method merges the one or more second storage attributes specified in the import list logical volume of step 610 with the (N) first storage attributes written to the export physical volume of step 570. By "merge," Applicants' mean to determine for each first storage attribute assigned to the logical volume, if a corresponding second storage attribute is specified in the import list logical volume. If such a conflict exists, the specified second storage attribute is selected. Applicants' method transitions from step 640 to step 645.

In step 645, Applicants' method clears zero or more of the Construct Overridden Flags. By "clearing" a Construct Overridden Flag, Applicants mean indicating that the first storage attribute associated with that Construct Overridden Flag, and assigned to the logical volume in step 540, and written to the export physical volume in step 570, has been selected by the importing virtual tape system in step 625 or step 640 for subsequent use with the imported logical volume. Applicants' method transitions from step 645 to step 650 wherein Applicants' method imports the logical volume into the second virtual tape system.

Applicants' method transitions from step 650 to step 655 wherein the selected storage attributes are assigned to the imported logical volume. In certain embodiments the assigned storage attributes comprise one or more first storage attributes, i.e. the storage attributes assigned to the logical volume by the exporting virtual tape system. In certain embodiments, the assigned storage attributes comprise one or more second storage attributes, i.e. storage attributes specified by the importing virtual tape system. In certain embodiments, the assigned storage attributes comprise one or more merged first storage attributes and one or more second storage attributes.

For example, the export physical volume of step 570 (FIG. 5) may include a data class attribute assigned to the exported logical volume by the exporting virtual tape system. The import list logical volume of step 610 may specify use of a certain management class attribute. In this example, Applicants' method in step 635 selects the management class attribute specified in the import list logical volume, sets the Construct Overridden Flag associated with that management class attribute in step 638, and assigns that management class attribute in step 655. Applicants' method further determines in step 640 that the data class attribute assigned by the exporting virtual tape system does not conflict with the instructions of the importing host computer. Applicants' method in step 640 merges that data class attribute with the management class sttribute from the import list logical volume, clears the Construct Overridden Flag associated with that data class attribute in step 645, and assigns that data class attribute in step 655 to the logical volume.

In step 660, Applicants' method saves the assigned storage attributes and the associated Construct Overridden Flags. In certain embodiments, the imported logical volume, the assigned storage attributes, and the associated Construct Overridden Flags, are saved in a library manager disposed in the importing, i.e. second, virtual tape system. In certain embodiments, the imported logical volume, the assigned storage attributes, and the associated Construct Overridden Flags, are saved in a library inventory, such as library inventory 460 (FIG. 4), disposed in the library manager disposed in the importing, i.e. second, virtual tape system.

In step 665, Applicants' method notifies the second host computer that the logical volume has been imported into the second virtual tape system. In step 670, during entry processing of the imported logical volume the second host computer requests the storage attributes assigned to, and the Construct Overridden Flags associated with, that imported logical volume by the second virtual tape system. In step 675, Applicants' method provides to the tape management system disposed in the second host computer the storage attributes assigned to the imported logical volume and the Construct Overridden Flags associated with the imported logical volume.

In certain embodiments, the second host in step 680 changes one or more storage attributes assigned by the second virtual tape system to the imported logical volume. In these embodiments, in step 685 Applicants' method clears the one or more Construct Overridden Flags associated with those one or more changed storage attributes. Step 685 further includes saving those cleared Construct Overridden Flags.

The embodiments of Applicants' method recited in FIGS. 5 and/or 6 may be implemented separately. Moreover, in certain embodiments, the individual steps recited in FIGS. 5 and/or 6 may be combined, eliminated, or reordered.

Applicants' invention includes an article of manufacture comprising a computer useable medium having computer readable program code disposed therein to import a logical volume indicating explicit storage attribute specifications. Applicants' invention further includes computer program products embodied as program code stored in one or more memory devices, such as a magnetic disk, a magnetic tape, or other non-volatile memory device, to import a logical volume indicating explicit storage attribute specifications.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to import a logical volume indicating explicit storage attribute specifications, comprising the steps of:
    providing a first virtual tape system comprising a first library inventory and a first information storage medium;
    maintaining a logical volume in said first information storage medium;
    assigning by said first virtual tape system (N) first storage attributes;
    writing an export list logical volume;
    providing a second virtual tape system, wherein said second virtual tape system comprises a second library inventory and a second information storage medium;
    defining in said second virtual tape system a plurality of second storage attributes;
    importing said logical volume and said (N) first storage attributes into said second virtual tape system;
    associating one or more construct overridden flags with said imported logical volume;
    determining if said import list logical volume specifies use of one or more of said second storage attributes;
    operative if said import list logical volume specifies use of one or more of said second storage attributes:
    assigning said one or more second storage attributes to said imported logical volume;
    setting one or more of said one or more construct overridden flags;
    saving in said second library said imported logical volume, said one or more assigned second storage attributes and said one or more construct overridden flags.

2. The method of claim 1, further comprising the steps of:
    operative if said import list logical volume does not specify use of one or more of said second storage attributes:
    assigning by said second virtual tape system said (N) first storage attributes to said logical volume;
    clearing (N) of said one or more construct overridden flags;
    saving in said second library said imported logical volume, said (N) assigned first storage attributes, and said one or more construct overridden flags.

3. The method of claim 1, further comprising the steps of:
    operative if said import list logical volume specifies use of one or more of said second storage attributes, determining if any of said (N) first storage attributes conflict with the specified one or more second storage attributes;
    operative for each of said (N) first storage attributes that does not conflict with said specified one or more second storage attributes:
    assigning by said second virtual tape system said non-conflicting first storage attribute to said logical volume;
    clearing the construct overridden flag associated with said non-conflicting first storage attribute;
    saving in said second library said non-conflicting first storage attribute and said associated cleared construct overridden flags.

4. The method of claim 1, further comprising the steps of:
    assigning by said first virtual tape system an identifier to said logical volume;
    writing an export physical volume by said first virtual tape system comprising said logical volume, said identifier, and said (N) first storage attributes; and
    mounting said export physical volume in said second virtual tape system.

5. The method of claim 4, further comprising the steps of:
    providing a first host computer, wherein said first host computer is capable of communicating with said first virtual tape system;
    forming a dataset;
    assigning by said first host computer (N) storage construct names to said dataset;
    providing said dataset and said (N) storage construct names to said first virtual tape system;
    writing said dataset to said logical volume;
    assigning to said logical volume by said first virtual tape system each of (N) storage construct names as a different one of said (N) first storage attributes.

6. The method of claim 1, further comprising the step of notifying said second host that said logical volume has been imported.

7. The method of claim 6, wherein said second host computer comprises a tape management system, further comprising the steps of:
- requesting said second virtual tape system provide said second host said assigned storage attributes and said construct overridden flags; and
- providing to said tape management system said assigned storage attributes and said construct overridden flags.

8. The method of claim 7, further comprising the step of providing to said second virtual tape system one or more changed storage attributes for said logical volume.

9. The method of claim 8, further comprising the steps of:
- saving said one or more changed storage attributes; and
- clearing the one or more construct overridden flags associated with each of said one or more changed storage attributes.

10. A method to import a logical volume indicating explicit storage attribute specifications, comprising the steps of:
- providing a first host computer;
- forming a dataset;
- defining a plurality of storage construct names;
- assigning (N) storage construct names to said dataset;
- providing a first virtual tape system comprising a first direct access storage device file buffer and a first library inventory, wherein said first virtual tape system is capable of communicating with said first host computer;
- providing said dataset and said (N) storage construct names to said first virtual tape system;
- maintaining a logical volume in said first direct access storage device file buffer;
- assigning by said first virtual tape system each of said (N) storage construct names as a different one of (N) first storage attributes;
- assigning by said first virtual tape system an identifier to said logical volume;
- storing said one or more first storage attributes and said identifier in said first library inventory;
- forming by said first host an export list logical volume comprising said identifier;
- writing by said first virtual tape system an export physical volume comprising said logical volume, said identifier, and said one or more first storage attributes;
- providing a second virtual tape system comprising a second direct access storage device file buffer and a second library inventory;
- defining by said second virtual tape system a plurality of second storage attributes;
- providing a second host computer, wherein said second virtual tape system is capable of communicating with said second host computer;
- forming by said second host computer an import list logical volume comprising said identifier;
- importing said logical volume into said second virtual tape system;
- associating one or more construct overridden flags with said imported logical volume;
- determining if said import list logical volume specifies use of one or more of said second storage attributes;
- operative if said import list logical volume specifies use of said second storage attributes:
  - assigning one or more of said plurality of second storage attributes to said imported logical volume;
  - setting one or more of said one or more construct overridden flags;
  - saving in said second library said imported logical volume, said one or more assigned second storage attributes and said one or more construct overridden flags;
  - determining if said one or more first storage attributes conflict with the specified one or more second storage attributes;
  - operative for each of said one or more first storage attributes that does not conflict with said specified one or more second storage attributes:
    - assigning said first storage attributes to said logical volume;
    - saving in said second library said assigned first storage attribute;
    - clearing the construct overridden flag associated with said assigned first storage attribute;
- operative if said import list logical volume does not specify use of said second storage attributes:
  - assigning said one or more first storage attributes to said logical volume;
  - clearing one or more of said one or more construct overridden flags;
  - saving in said second library said imported logical volume, said one or more assigned first storage attributes, and said one or more construct overridden flags;
- notifying said second host that said logical volume has been imported;
- requesting said second virtual tape system provide to said second host said assigned storage attributes and said one or more construct overridden flags;
- providing said assigned storage attributes and said one or more construct overridden flags to said tape management system;
- providing to said second virtual tape system one or more changed storage attributes for said logical volume; and
- clearing the one or more construct overridden flags associated with each of said one or more changed storage attributes.

11. An article of manufacture comprising a computer useable medium having computer readable program code disposed therein to export a logical volume and storage attributes assigned to import a logical volume indicating explicit storage attribute specifications from a first virtual tape system into a second virtual tape system, wherein said first virtual tape system comprises a first direct access storage device file buffer and a first library inventory, wherein said first virtual tape system is capable of communicating with a first host computer, wherein said second virtual tape system comprises a second direct access storage device file buffer and a second library inventory, wherein said second virtual tape system is capable of communicating with a second host computer, the computer readable program code comprising a series of computer readable program steps to effect:
- maintaining a logical volume in said first direct access storage device file buffer;
- assigning (N) first storage attributes to said logical volume;
- writing an export list logical volume;
- defining a plurality of second storage attributes;
- importing said logical volume and said (N) first storage attributes into said second virtual tape system;

associating one or more construct overridden flags with said imported logical volume;

determining if said import list logical volume specifies use of one or more of said second storage attributes;

operative if said import list logical volume specifies use of one or more of said second storage attributes:

assigning said one or more second storage attributes to said imported logical volume;

setting one or more of said one or more construct overridden flags;

saving in said second library said imported logical volume, said one or more assigned second storage attributes and said one or more construct overridden flags 12. The article of manufacture of claim 11, wherein said computer readable program code further comprises a series of computer readable program steps to effect:

operative if said import list logical volume does not specify use of one or more of said second storage attributes:

assigning said (N) first storage attributes to said logical volume;

clearing one or more of said one or more construct overridden flags;

saving in said second library said imported logical volume, said (N) assigned first storage attributes, and said one or more construct overridden flags.

13. The article of manufacture of claim 11, wherein said computer readable program code further comprises a series of computer readable program steps to effect:

operative if said import list logical volume specifies use of one or more of said second storage attributes, determining if any of said (N) first storage attributes conflict with the specified one or more second storage attributes;

operative for each of said (N) first storage attributes that does not conflict with said specified one or more second storage attributes:

assigning said non-conflicting first storage attribute to said logical volume;

clearing the construct overridden flag associated with said non-conflicting first storage attribute;

saving in said second library said imported logical volume, said non-conflicting first storage attribute, and said one or more construct overridden flag associated with said non-conflicting first storage attribute.

14. The article of manufacture of claim 11, wherein said computer readable program code further comprises a series of computer readable program steps to effect:

assigning an identifier to said logical volume; and writing an export physical volume comprising said logical volume, said identifier, and said (N) first storage attributes.

15. The article of manufacture of claim 14, the computer readable program code comprising a series of computer readable program steps to effect:

receiving a dataset;

receiving (N) storage construct names assigned to said dataset;

writing said dataset to said logical volume;

assigning each of said (N) storage construct names as a different one of said (N) first storage attributes.

16. The article of manufacture of claim 11, the computer readable program code comprising a series of computer readable program steps to effect notifying said second host that said logical volume has been imported.

17. The article of manufacture of claim 16, wherein said second host computer comprises a tape management system, the computer readable program code comprising a series of computer readable program steps to effect:

receiving a request from said second host to provide said assigned storage attributes and said construct overridden flags; and providing to said tape management system said assigned storage attributes and said construct overridden flags.

18. The method of claim 17, the computer readable program code comprising a series of computer readable program steps to effect receiving from said second host computer one or more changed storage attributes for said logical volume.

19. The method of claim 18, the computer readable program code comprising a series of computer readable program steps to effect:

saving said one or more changed storage attributes; and clearing the one or more construct overridden flags associated with each of said one or more changed storage attributes.

20. An article of manufacture comprising a computer useable medium having computer readable program code disposed therein to import a logical volume indicating explicit storage attribute specifications from a first virtual tape system into a second virtual tape system, wherein said first virtual tape system comprises a first direct access storage device file buffer and a first library inventory, wherein said first virtual tape system is capable of communicating with a first host computer, wherein said second virtual tape system comprises a second direct access storage device file buffer and a second library inventory, wherein said second virtual tape system is capable of communicating with a second host computer, the computer readable program code comprising a series of computer readable program steps to effect:

maintaining a logical volume in said first direct access storage device file buffer;

receiving one or more storage construct names;

assigning to said logical volume each of said one more storage construct names as a different one of one or more first storage attributes;

assigning an identifier to said logical volume;

storing said one or more first storage attributes and said identifier in said first library inventory;

receiving an export list logical volume comprising said identifier;

writing an export physical volume comprising said logical volume, said identifier, and said one or more first storage attributes;

defining a plurality of second storage attributes;

receiving an import list logical volume comprising said identifier;

importing said logical volume into said second virtual tape system;

associating one or more construct overridden flags with said imported logical volume;

determining if said import list logical volume specifies use of one or more of said second storage attributes;

operative if said import list logical volume specifies use of said second storage attributes:

assigning one or more of said plurality of second storage attributes to said imported logical volume;

setting one or more of said one or more construct overridden flags;

saving in said second library said imported logical volume, said one or more assigned second storage attributes and said one or more construct overridden flags;

determining if said one or more assigned first storage attributes conflict with the specified one or more second storage attributes;

operative for each of said one or more assigned first storage attributes that does not conflict with said specified one or more second storage attributes:
  saving in said second library said non-conflicting first storage attribute;
  clearing the construct overridden flag associated with said non-conflicting first storage attribute;

operative if said import list logical volume does not specify use of said second storage attributes:
  clearing one or more of said one or more construct overridden flags;
  saving in said second library said imported logical volume, said one or more assigned first storage attributes, and said one or more construct overridden flags;

notifying said second host that said logical volume has been imported;

receiving one or more changed storage attributes for said logical volume; and clearing the one or more construct overridden flags associated with each of said one or more changed storage attributes.

21. A computer program product usable with a programmable computer processor having computer readable program code embodied therein to import a logical volume indicating explicit storage attribute specifications from a first virtual tape system into a second virtual tape system, wherein said first virtual tape system comprises a first direct access storage device file buffer and a first library inventory, wherein said first virtual tape system is capable of communicating with a first host computer, wherein said second virtual tape system comprises a second direct access storage device file buffer and a second library inventory, wherein said second virtual tape system is capable of communicating with a second host computer, comprising:

computer readable program code which causes said programmable computer processor to maintain a logical volume in said first direct access storage device file buffer;

computer readable program code which causes said programmable computer processor to assign (N) first storage attributes to said logical volume;

computer readable program code which causes said programmable computer processor to write an export list logical volume;

computer readable program code which causes said programmable computer processor to define a plurality of second storage attributes;

computer readable program code which causes said programmable computer processor to import said logical volume and said (N) first storage attributes into said second virtual tape system;

computer readable program code which causes said programmable computer processor to associate one or more construct overridden flags with said imported logical volume;

computer readable program code which causes said programmable computer processor to determine if said import list logical volume specifies use of one or more of said second storage attributes;

computer readable program code which, if said import list logical volume specifies use of said second storage attributes causes said programmable computer processor to:
assign one or more of said plurality of second storage attributes to said imported logical volume;
set one or more of said one or more construct overridden flags;
save in said second library said imported logical volume, said one or more assigned second storage attributes and said one or more construct overridden flags.

22. The computer program product of claim 21, further comprising:
computer readable program code which, if said import list logical volume does not specify use of one or more of said second storage attributes causes said programmable computer processor to:
assign said (N) first storage attributes to said logical volume clear one or more of said one or more construct overridden flags;
save in said second library said imported logical volume, said (N) assigned first storage attributes, and said one or more construct overridden flags.

23. The computer program product of claim 21, further comprising:
computer readable program code which, if said import list logical volume specifies use of one or more of said second storage attributes, causes said programmable computer processor to determine if any of said (N) first storage attributes conflict with the specified one or more second storage attributes;
computer readable program code which, for each of said (N) first storage attributes do not conflict with said specified one or more second storage attributes, causes said programmable computer processor to assign that non-conflicting first storage attributes to said logical volume, clear the construct overridden flag associated with that non-conflicting first storage attribute, and save in said second library said non-conflicting first storage attributes, and said construct overridden flag associated with that non-conflicting first storage attribute.

24. The computer program product of claim 21, further comprising:
computer readable program code which causes said programmable computer processor to assign an identifier to said logical volume;
computer readable program code which causes said programmable computer processor to write an export physical volume comprising said logical volume, said identifier, and said one or more assigned first storage attributes.

25. The computer program product of claim 24, further comprising:
computer readable program code which causes said programmable computer processor to receive (N) storage construct names;
computer readable program code which causes said programmable computer processor to assign each of said (N) storage construct names as a different one of said (N) first storage attributes.

26. The computer program product of claim 25, further comprising computer readable program code which causes said programmable computer processor to notify an importing host computer that said logical volume has been imported.

27. The computer program product of claim 26, wherein said importing host computer comprises a tape management system, further comprising:
- computer readable program code which causes said programmable computer processor to from said importing host computer a request to provide said assigned storage attributes and said construct overridden flags; and
- computer readable program code which causes said programmable computer processor to provide to said tape management system said assigned storage attributes and said construct overridden flags.

28. The computer program product of claim 27, further comprising computer readable program code which causes said programmable computer processor to receive from said importing host computer one or more changed storage attributes for said logical volume.

29. The computer program product of claim 28, further comprising computer readable program code which causes said programmable computer processor to clear the one or more construct overridden flags associated with each of said one or more changed storage attributes.

30. A computer program product usable with a programmable computer processor having computer readable program code embodied therein to import a logical volume indicating explicit storage attribute specifications from a first virtual tape system into a second virtual tape system, wherein said first virtual tape system comprises a first direct access storage device file buffer and a first library inventory, wherein said first virtual tape system is capable of communicating with a first host computer, wherein said second virtual tape system comprises a second direct access storage device file buffer and a second library inventory, wherein said second virtual tape system is capable of communicating with a second host computer, comprising:
- computer readable program code which causes said programmable computer processor to maintain a logical volume in said first direct access storage device file buffer;
- computer readable program code which causes said programmable computer processor to receive from said first host computer one or more storage construct names;
- computer readable program code which causes said programmable computer processor to assign to said logical volume each of said one more storage construct names as a different one of one or more first storage attributes;
- computer readable program code which causes said programmable computer processor to assign an identifier to said logical volume;
- computer readable program code which causes said programmable computer processor to store said one or more first storage attributes and said identifier in said first library inventory;
- computer readable program code which causes said programmable computer processor to receive from said first host computer an export list logical volume comprising said identifier;
- computer readable program code which causes said programmable computer processor to write an export physical volume comprising said logical volume, said identifier, and said one or more first storage attributes;
- computer readable program code which causes said programmable computer processor to define a plurality of second storage attributes;
- computer readable program code which causes said programmable computer processor to receive an import list logical volume comprising said identifier;
- computer readable program code which causes said programmable computer processor to import said logical volume into said second virtual tape system;
- computer readable program code which causes said programmable computer processor to associate one or more construct overridden flags with said imported logical volume;
- computer readable program code which causes said programmable computer processor to determine if said import list logical volume specifies use of one or more of said second storage attributes;
- computer readable program code which, if said import list logical volume specifies use of said second storage attributes causes said programmable computer processor to:
  - assign one or more of said plurality of second storage attributes to said imported logical volume;
  - set one or more of said one or more construct overridden flags;
  - save in said second library said imported logical volume, said one or more assigned second storage attributes and said one or more construct overridden flags;
  - determine if said one or more first storage attributes conflict with the specified one or more second storage attributes;
  - computer readable program code which, for each of said one or more first storage attributes that does not conflict with said specified one or more second storage attributes causes said programmable computer processor to assign said non-conflicting first storage attributes to said logical volume, clear the construct overridden flag associated with said non-conflicting first storage attribute, and save in said second library said non-conflicting first storage attributes and said associated construct overridden flag;
- computer readable program code which, if said import list logical volume does not specify use of said second storage attributes causes said programmable computer processor to assign said one or more first storage attributes to said logical volume, clear one or more of said one or more construct overridden flags, and save in said second library said imported logical volume said one or more assigned first storage attributes, and said one or more construct overridden flags;
- computer readable program code which causes said programmable computer processor to notify said second host that said logical volume has been imported;
- computer readable program code which causes said programmable computer processor to receive from said second host computer a request to provide said assigned storage attributes and said one or more construct overridden flags;
- computer readable program code which causes said programmable computer processor to provide said assigned storage attributes and said one or more construct overridden flags to said second host computer;
- computer readable program code which causes said programmable computer processor to receive from said second host computer one or more changed storage attributes for said logical volume; and
- computer readable program code which causes said programmable computer processor to clear the one or more construct overridden flags associated with each of said one or more changed storage attributes.

* * * * *